Sept. 9, 1969 R. C. FERGASON 3,465,506
STALK CROWDER ATTACHMENT FOR COTTON HARVESTER
Filed Aug. 11, 1967 4 Sheets-Sheet 1
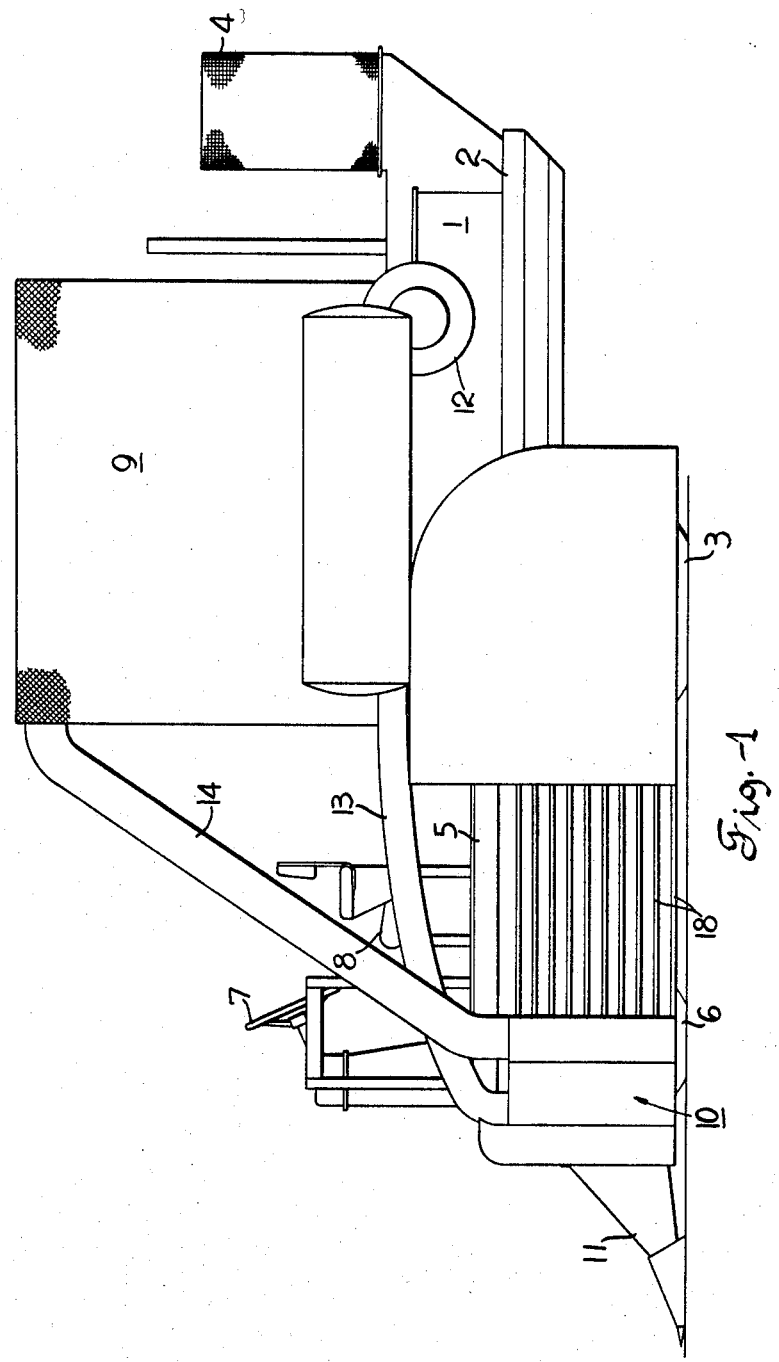

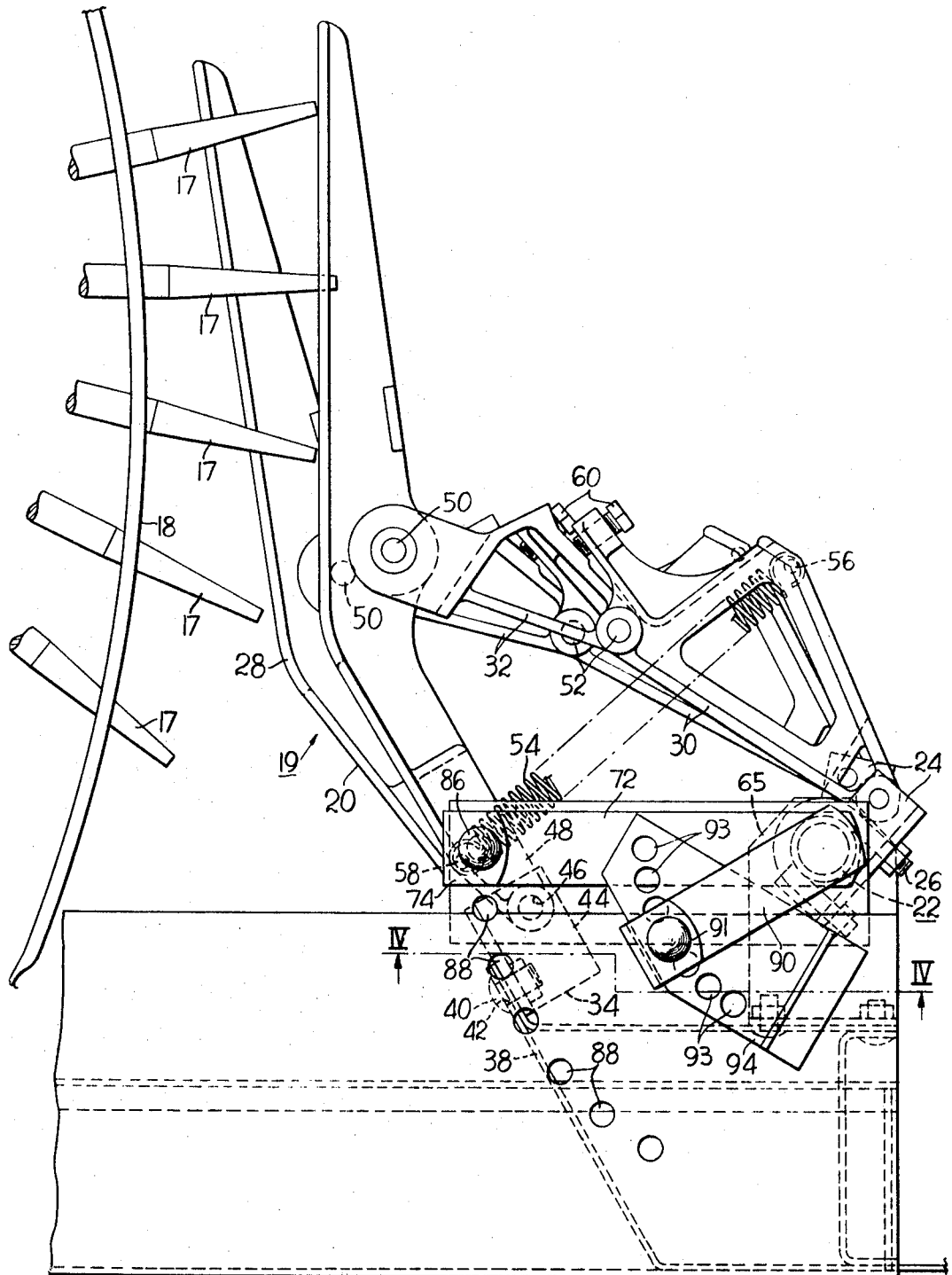

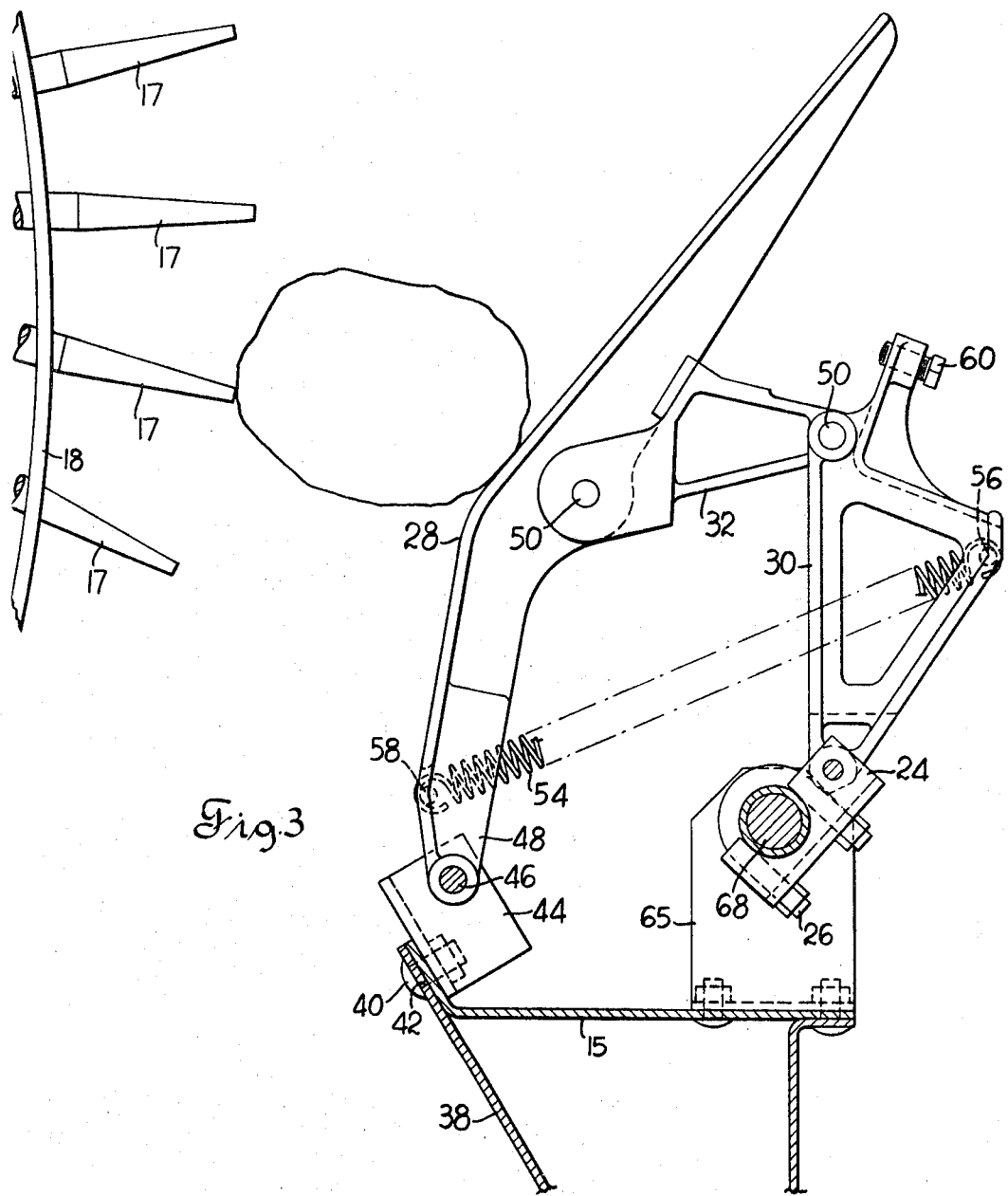

Sept. 9, 1969 R. C. FERGASON 3,465,506
STALK CROWDER ATTACHMENT FOR COTTON HARVESTER
Filed Aug. 11, 1967 4 Sheets-Sheet 4
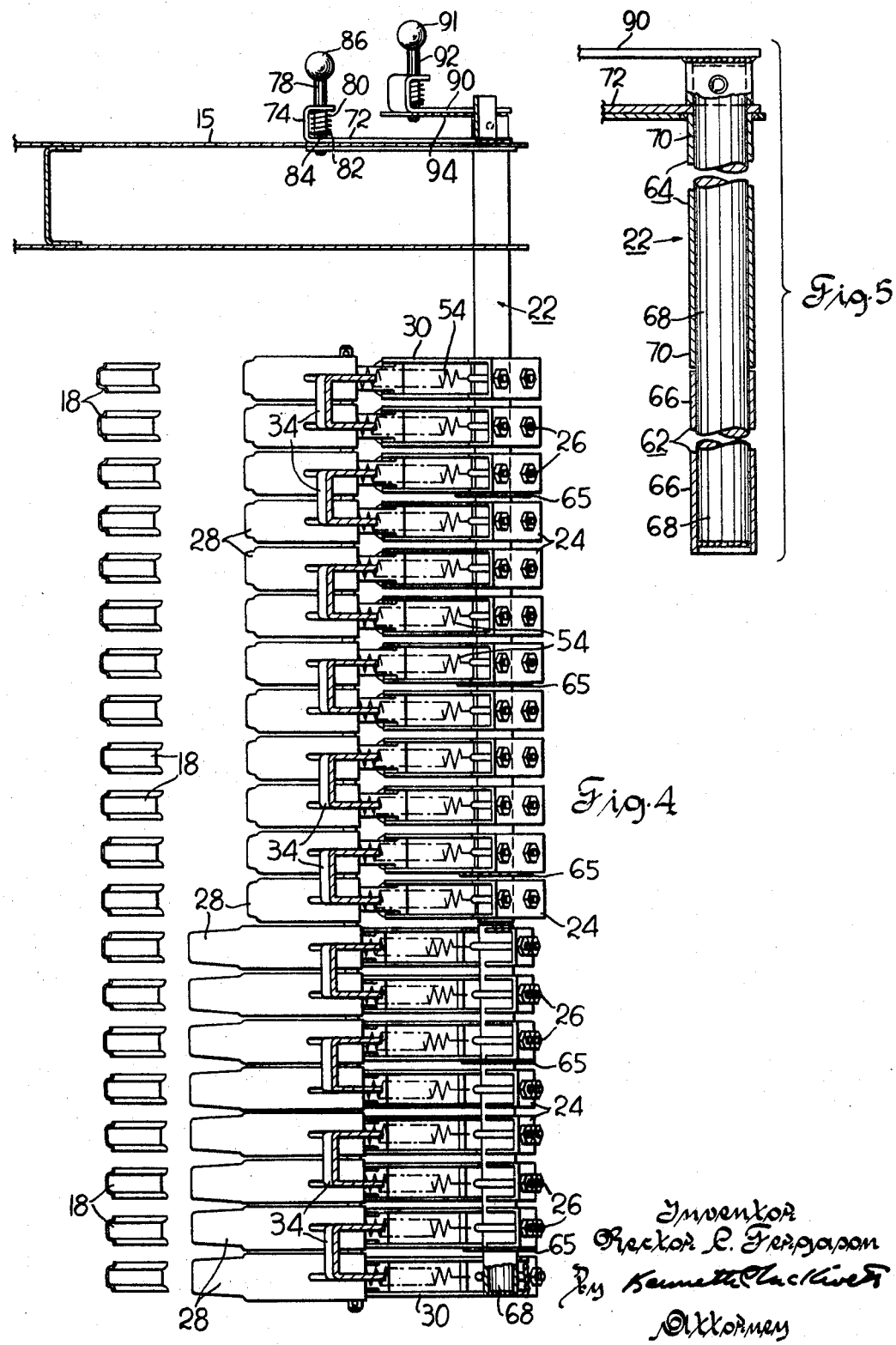

United States Patent Office 3,465,506
Patented Sept. 9, 1969

3,465,506
STALK CROWDER ATTACHMENT FOR COTTON
HARVESTER
Rector C. Fergason, Gadsen, Ala., assignor to Allis-
Chalmers Manufacturing Company, Milwaukee, Wis.
Filed Aug. 11, 1967, Ser. No. 660,121
Int. Cl. A01d 45/20
U.S. Cl. 56—44 7 Claims

ABSTRACT OF THE DISCLOSURE

A cotton picker stalk crowder wherein individual crowders are provided and are adjustable, and upper and lower banks of such individual crowders are adjustable as banks.

The present invention relates to cotton harvesters and more particularly to an improved stalk crowder device which will protect the machine against damage should a rock or similar obstruction enter the picking unit.

Cotton harvesters are usually provided with a picking tunnel through which the cotton plants move while the machine advances over the field. Before the cotton plants enter the picking tunnel, they are gathered and pressed together from opposite sides by a pair of plant dividers which are mounted ahead of the picking tunnel. As the laterally compacted plants move through the picking tunnel, rotating picking spindles are thrust into and withdrawn from the picking tunnel in order to remove cotton fiber from the mass of compacted plant material.

The lower portions or points of the plant dividers are run close to the ground so as to pick up low branches of cotton plants and guide them into the picking tunnel. If a stone or like object is picked up by the dividers and fed along with cotton plants into the picking tunnel, one or more of the spindles and other parts of the machine could be damaged.

It is well known in the art to provide pressure plates or crowders to urge cotton plants against the spindles of a picking unit. The crowders slide along the side of the plants opposite to the spindles and resiliently press the cotton plants toward the spindles by means of biasing springs or like elements. In the event a rock or similar obstruction enters the picking tunnel, the crowder will yield to permit the obstruction to pass through the tunnel without damaging the spindles. It is desirable to provide the crowders with mechanism so that initial movement of the crowders is opposed by a relatively strong force, but once the initial resistance is overcome a lesser force will suffice to progressively increase the effective width of the tunnel.

It is also desirable to provide an adjustment so that the initial tripping resistance of the crowders can be varied to suit conditions. Thus, for rows of cotton plants having generally large thick stalks, the trip resistance can be increased so as to bring all parts of the plants within reach of the spindles. For rows having generally light stalks, the resistance can be reduced so that the stalks are not excessively crushed or broken and the trip mechanism is more sensitive to foreign objects.

In the prior art, no adequate means for both adjusting crowders individually and/or collectively has been provided. The art teaches crowders acting on a substantial area of the picking zone thereby requiring pressure of a magnitude that could cause damage to the spindles before yielding. When multiple crowders were used, no provision was made for collectively adjusting the upper bank of crowders outwardly to widen the upper portion of the picking tunnel to protect the green bolls during early picking and to collectively adjust the lower crowders inwardly to pick the ripened cotton on the lower portion of the plant.

In the present structure there has been provided a series of vertically spaced individual crowders, one for each horizontal row of spindles and which crowders can be individually positioned with respect to the picking tunnel, without affecting their resistance to yielding. The upper and lower crowders can be adjusted relative to each other as banks by a single actuating means, and yet the toggle linkage of each individual crowder can be adjusted to vary its individual breakback resistance.

Accordingly with the present invention the picking elements are provided with individually adjusted and mounted crowders which provide a great variety of relative adjustments which are possible by pivoting the crowders into various positions relative to each other and to the picking tunnel. The shape of the passage for gathering in, compressing and releasing the cotton plants can thus be adjusted to suit the growth and type of plant being harvested.

It is therefore an object of this invention to provide an improved plant crowder for a cotton harvester.

It is a further object of this invention to provide an improved plant crowder wherein the upper or lower bank of individual plant crowders can be adjusted independent of the other.

It is a further object of this invention to provide a cotton harvester with a plurality of plant crowders all of which are individually adjustable and which are adjustable by groups and yet retain their original settings.

These and other objects and advantages are obtained by the present invention, various novel features of which will be apparent from the description herein and the accompanying drawings disclosing an embodiment of the invention, and will be more particularly pointed out in the appended claims.

In the drawings:

FIG. 1 is a side elevation view of a cotton harvester;

FIG. 2 is a plan view of a portion of the stalk crowder assembly showing the upper and lower stalk crowder assemblies in a picking position and showing stalk guides, picking spindles and stalk crowder actuating levers;

FIG. 3 is a view similar to FIG. 2 showing one of the stalk crowder linkages broken back to allow an obstruction to pass through;

FIG. 4 is a view taken on line IV—IV of FIG. 2 showing the rleative openings between the upper and lower stalk crowder assemblies;

FIG. 5 is a view partially in section of the upper and lower actuating levers as associated with the rod and tube in the stalk crowder assembly.

Referring to FIG. 1, the cotton harvester embodying the invention consists generally of an engine 1 joined to an axle housing and supported thereby as a cantiliver beam. A frame member 2 supports engine 1 from the axle housing. A pair of laterally spaced traction wheels 3 (only one of which is shown) are operatively connected to opposite ends of the axle housing in a conventional manner. Engine 1 is provided with an air intake screen 4 which is carried by the engine. A forwardly extending frame 5 is attached at its rear end to the axle housing. The forward end of frame 5 is supported on a dirigible wheel 6 which is operatively connected to steering wheel 7 carried by the forward end of frame 5. An operator's seat 8 is carried by frame 5 rearwardly of the steering wheel 7. A picked cotton receiving basket 9 is carried on frame members 2 and 5 rearwardly of operator's seat 8. Cotton picker assemblies 10 are mounted on each side of the forward end of frame 5. These assemblies are carried by a subframe (not shown) which is adjustably connected to frame 5 for vertical movement relative thereto. The forward end of assemblies 10 are provided with plant dividers 11 which guide cotton plants into contact with cotton pickers which are positioned just rearwardly of the plant dividers. Frame 2 supports a blower 12 which is provided with a duct 13 which delivers pressurized air to picking assembly 10 and from there to a cotton delivery duct 14 for depositing picked cotton into basket 9.

Referring to FIG. 2, the reference numeral 15 indicates the frame of the foreportion of the cotton harvester, and 16 indicates the throat or entrance of the picking tunnel through which the cotton plants enter. Picking spindles 17, carried by a rotating picking drum (not shown) extend between stalk guides 18 which form the inner side of the tunnel, and stalk crowder 19 forms the opposite or outer side of the tunnel.

The crowder mechanism 19 is composed of individual toggle link crowders 20 which are adjustably clamped to a shaft 22 in vertical spaced relation by means of brackets 24 and U-bolts 26. The toggle link crowders 20 include a stalk crowder member 28, toggle spring links 30 and toggle member 32. The forward ends of crowder members 28 are pivotally mounted to frame 15 by means of brackets 34 which are rigidly secured to the rear edge of the tunnel entrance wall 38 by means of bolts 40 received in wall openings 42. The brackets 34 are U-shaped in form, with each leg 44 being apertured at 46 to pivotally receive the slotted forward end 48 of crowder members 28.

Toggle member 32 is pivotally connected to a midportion of crowder member 28 as at 50 and to the toggle spring link 30 by means of pin 52. A tension spring 54 has one end connected to toggle spring link 30 as at 56 and its other end connected to stalk crowder 28 as at 58. Spring 54 resiliently urges the toggle link crowder members 28 into their engaged operating positions.

The amount of displacement from dead center of toggle pivot 52 is controlled by a set screw 60 which sets the amount of pressure required to break back the toggle linkage of crowder 20. It should be noted here that brackets 24 provide a lever arm pivoting about the axis of shaft 22 and which arm moves the individual crowder in and out relative to the picking tunnel without having any effect on the toggle breakback adjustment.

The vertical shaft 22 (see FIG. 5) is made up of a lower section 62 and an upper section 64 with the two sections being interconnected for relative rotation about a common vertical axis. The upper and lower shaft sections 62 and 64 are rotatably received by a suitable frame supported means 65 (see FIG. 4) and include a tubular member 66 (see FIG. 5) which rigidly receives, as by welding, an upwardly extending coaxial shaft 68. The upper shaft section 64 consists of a tubular shaft member 70 rotatably received on the shaft 68 and is provided with an actuating lever 72.

Upper tubular shaft member 70 abuts the lower tubular member 66 forming a split vertical shaft 22 on which all of the toggle spring links are mounted by means of brackets 24 and U-bolts 26. The actuating lever 72 has its outer end 74 bent in the shape of a U and is provided with vertically aligned openings to receive a locking pin 78 (FIG. 4). This locking pin 78 is biased in a downward direction by means of a compression spring 80 which spring surrounds the pin 78 and bears against a washer 82 and a pin abutment 84. The upper end of pin 78 is provided with a knob 86 for hand operation. The locking pin is selectively received in any one of a series of openings 88 (see FIG. 2) provided in the upper portion of frame 15.

Shaft 68 extends upwardly through shaft 70 and above the lever 72 and mounts a similar actuating lever 90 of shorter length having an operating knob 91 having a pin 92 which selectively engages any desired opening 93 formed in the elevated rack member 94 which is secured, as by welding to frame 15.

It should be noted that the in and out position of the lower eight crowders 20 are controlled by the upper short lever 90 and the upper twelve crowders 20 are controlled by the long actuating lever 72. Accordingly, each of the individual crowders can be adjusted relative to the shaft 22 without effecting the toggle linkage and they can also be readily adjusted in selected groups by the actuation of levers 72 and 90. Accordingly, it is seen that stalk crowders have been provided which can be adjusted individually as by loosening U-bolts 26 and swinging the individual crowder about shaft 22 or the stalk crowders can be adjusted in banks by the actuation of levers 72 or 90 or both banks can be actuated at the same time.

Referring to FIG. 3, it is seen how the toggle mechanism of stalk crowder 19 breaks when a stone 95 is encountered by member 28. By thus breaking, the toggle mechanism tends to eliminate destructive contact between stone and spindle. After the stone 95 has passed the stalk crowder 19, the crowder resumes the position shown in FIG. 2.

It is therefore believed that the present invention provides a combination of controls for stalk crowders which will permit solutions of all crowder problems likely to be met in the field. One of the most common problems is illustrated in FIGS. 2 and 4. This is the problem of harvesting cotton when the upper portion of the cotton plant only contains green bolls while the lower portion of the plant has ripe cotton. In this situation, it is desired to move the lower bank of crowders close to their coactive spindles so that the spindles can do an aggressive job of picking, but by the same token, it is desired to position the upper bank of crowders away from the spindles so that spindles will not damage the green bolls which will then be available for picking at a later date. As shown in FIGS. 2 and 4, the lower bank of crowders is positioned for aggressive picking while the upper bank is positioned for nonaggressive picking.

While FIG. 4 shows the lower eight crowders functioning as one bank, it is possible to manually reposition adjacent crowders of the upper bank on shaft 22 so that they would be functioning similar to the lower bank. The illustration shows the lower eight crowders as one bank merely because experience has indicated this is the most usual condition.

While in the foregoing a preferred embodiment of the invention has been shown and described, it should be understood that it is not intended to limit the invention to the illustrated details of construction but that the invention includes such other forms and modifications as are embraced by the scope of the appended claims.

The embodiments of the invention in which an exclusive property or privilege is claimed are defined as follows:

1. In a picking unit for cotton harvesters, the combination of a frame structure; a horizontal stalk guide structure operatively mounted on said frame structure, said picking unit comprising a plurality of horizontally extending rows of picking spindles extending through said guide structure, a stalk crowder structure; pivot means operatively mounting said stalk crowder structure on said frame structure for horizontal swinging movement into and out of a predetermined position opposed to said spindles; each stalk crowder includes a toggle mechanism permitting such individual crowder to pivot away from said spindles when a predetermined force is exerted against said individual crowder, and said toggle mechanism being so constructed as to oppose swinging movement of said crowder away from said spindles with progressively decreasing resistance.

2. The combination as set forth in claim 1 and wherein said pivot means comprises a split vertical shaft wherein an upper bank of individual stalk crowders are attached to one portion of said split shaft and a lower bank of individual stalk crowders are attached to another portion of said shaft so that said upper bank can be adjustably pivoted relative to said spindles independent of the adjustment of said lower bank.

3. The combination as set forth in claim 2 and wherein said lower bank of stalk crowders can be adjustably pivoted relative to said spindles independent of the adjustment of said upper bank.

4. The combination as set forth in claim 1 and wherein said stalk crowder comprises an individual stalk crowder mounted opposite each row of spindles.

5. The combination recited in claim 1 and wherein each individual stalk crowder is adjustably mounted on said pivot means for positioning closer to or farther away from its opposed row of spindles.

6. The combination recited in claim 1 and wherein the toggle mechanism of each stalk crowder is adjustable for varying the force required for moving said individual stalk crowder away from its opposed row of spindles.

7. The combination recited in claim 6 and wherein said toggle mechanism is so constructed and arranged that pivotal movement of said individual crowders about the vertical axis of said pivot means to change the spacing between crowder and spindles does not change the force required to overcome the toggle mechanism of said crowder.

References Cited
UNITED STATES PATENTS

| | | | |
|---|---|---|---|
| 2,025,514 | 12/1935 | Johnston | 56—36 |
| 2,140,631 | 12/1938 | Johnston | 56—43 |
| 2,669,081 | 2/1954 | Weems et al. | 56—47 |
| 3,030,757 | 4/1962 | Hubbard | 56—43 |
| 3,354,625 | 11/1967 | Taylor et al. | 56—44 |

RUSSELL R. KINSEY, Primary Examiner